(12) United States Patent
Banerjee et al.

(10) Patent No.: US 8,606,823 B1
(45) Date of Patent: Dec. 10, 2013

(54) SELECTING AN ITEM FROM A CACHE BASED ON A RANK-ORDER OF THE ITEM

(75) Inventors: Ashok Banerjee, Fremont, CA (US); Waynn Lue, San Marino, CA (US)

(73) Assignee: Google Inc., Mountain View, CA (US)

( * ) Notice: Subject to any disclaimer, the term of this patent is extended or adjusted under 35 U.S.C. 154(b) by 65 days.

(21) Appl. No.: 13/272,121

(22) Filed: Oct. 12, 2011

Related U.S. Application Data

(63) Continuation of application No. 12/139,255, filed on Jun. 13, 2008, now abandoned.

(51) Int. Cl.
*G06F 17/30* (2006.01)

(52) U.S. Cl.
USPC .......................................... 707/802; 707/825

(58) Field of Classification Search
USPC .................................. 707/802, 825
See application file for complete search history.

(56) References Cited

U.S. PATENT DOCUMENTS

| | | | |
|---|---|---|---|
| 5,909,508 A * | 6/1999 | Wakatani et al. | 382/225 |
| 7,878,390 B1 * | 2/2011 | Batten et al. | 235/51 |
| 2004/0034633 A1 * | 2/2004 | Rickard | 707/5 |
| 2006/0052115 A1 * | 3/2006 | Khushu | 455/456.3 |
| 2008/0010414 A1 * | 1/2008 | Kailas et al. | 711/133 |
| 2008/0306917 A1 * | 12/2008 | Ishii et al. | 707/3 |
| 2009/0228647 A1 * | 9/2009 | Klems et al. | 711/113 |

* cited by examiner

*Primary Examiner* — Son T Hoang
(74) *Attorney, Agent, or Firm* — King & Spalding LLP

(57) ABSTRACT

A system that facilitates selecting an item from a cache based on a rank-order of the item picks a first item and a second item from the cache. Next, the system compares a rank-order of the first item with a rank-order of the second item. If the rank-order of the first item exceeds the rank-order of the second item, the system designates the first item as a winner of a first contest. However, if the rank-order of the first item is less than the rank-order of the second item, the system designates the second item as the winner of the first contest. Finally, the system selects the winner of the first contest as a selected item.

16 Claims, 5 Drawing Sheets

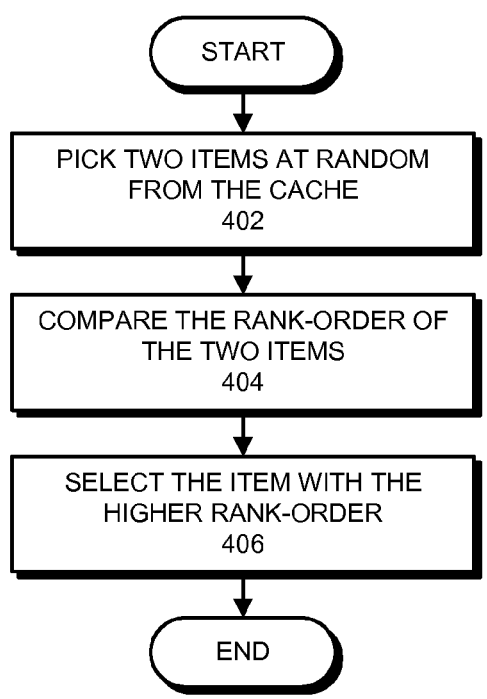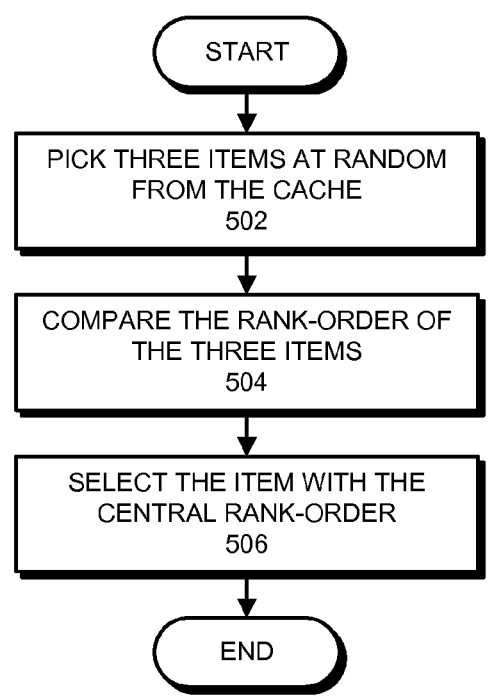
FIG. 4
FIG. 5

SELECTING AN ITEM FROM A CACHE BASED ON A RANK-ORDER OF THE ITEM

RELATED APPLICATION

This application is a continuation application of, and hereby claims priority under 35 U.S.C. §120 to, pending U.S. patent application Ser. No. 12/139,255, entitled "Selecting an Item from a Cache Based on a Rank-Order of the Item," by inventors Ashol Banerjee and Waynn Lue, filed on 13 Jun. 2008.

BACKGROUND

1. Field of the Invention

The present invention relates to caches for databases and servers. More specifically, the present invention relates to a method and an apparatus for facilitating selecting an item from a cache based on a rank-order of the item.

2. Related Art

In order to increase performance while servicing multiple requests, many computer systems store items that are likely to be accessed in a local cache. These items can be accessed more quickly from the local cache than from a remote data store. However, caches have certain limitations.

For example, caches can only hold a limited number of items. Hence, caches typically use certain criteria for determining whether to add items to the cache, as well as certain eviction criteria for determining whether to remove items from the cache. These criteria can be selected based on cache access patterns and computer system preferences. However, if these criteria and preferences switch rapidly, the computer systems may have to maintain several pre-sorted caches (one for each access pattern) to achieve satisfactory performance. However, such a system may be cost-prohibitive if there are a very large number of cache eviction criteria. Furthermore, this approach is also wasteful in terms of disk space and memory.

SUMMARY

One embodiment of the present invention provides a system that facilitates selecting an item from a cache based on a rank-order of the item. During operation, the system picks a first item and a second item from a cache. Next, the system compares a rank-order of the first item with a rank-order of the second item. If the rank-order of the first item exceeds the rank-order of the second item, the system designates the first item as a winner of a first contest. However, if the rank-order of the first item is less than the rank-order of the second item, the system designates the second item as the winner of the first contest. Finally, the system selects the winner of the first contest as a selected item.

In some embodiments of the present invention, the system picks a third item from the cache. The system also picks a fourth item from the cache. Next, the system compares a rank-order of the third item with a rank-order of the fourth item. If the rank-order of the third item exceeds the rank-order of the fourth item, the system designates the third item as a winner of a second contest. However, if the rank-order of the third item is less than the rank-order of the fourth item, the system designates the fourth item as the winner of the second contest. The system then compares the rank-order of the winner of the first contest and the rank-order of the winner of the second contest. If the rank-order of the winner of the first contest exceeds the rank-order of the winner of the second contest, the system selects the winner of the first contest as the selected item. However, if the rank-order of the winner of the first contest is less than the rank-order of the winner of the second contest, the system selects the winner of the second contest as the selected item.

In some embodiments of the present invention, selecting the selected item further involves performing n additional contests, wherein the selected item is an overall winner of the n additional contests.

In some embodiments of the present invention, the first contest, the second contest, and the n additional contests are conducted in parallel.

In some embodiments of the present invention, the system receives a new item which is not in the cache. Next, the system picks a third item from the cache. The system then compares a rank-order of the new item and a rank-order of the third item. If the rank-order of the new item exceeds the rank-order of the third item, the system evicts the third item from the cache, and inserts the new item into the cache.

In some embodiments of the present invention, the selected item is evicted from the cache.

In some embodiments of the present invention, the selected item is returned to a user or an application.

In some embodiments of the present invention, entries in the cache are not sorted.

In some embodiments of the present invention, the cache is implemented in software.

One embodiment of the present invention provides a system that facilitates selecting an item from a cache based on a rank-order of the item. During operation, the system picks a first item, a second item, and a third item from a cache. The system then compares a rank-order of the first item, a rank-order of the second item, and a rank-order of the third item. If the rank-order of the first item is in the middle of the rank-order of the first item, the second item, and the third item, the system selects the first item as a selected item. If the rank-order of the second item is in the middle of the rank-order of the first item, the second item, and the third item, the system selects the second item as the selected item. Similarly, if the rank-order of the third item is in the middle of the rank-order of the first item, the second item, and the third item, the system selects the third item as the selected item.

BRIEF DESCRIPTION OF THE FIGURES

FIG. 4 presents a flow chart illustrating the process of rank-order selection in accordance with an embodiment of the present invention.

FIG. 5 presents a flow chart illustrating the process of selection based on centrality in accordance with an embodiment of the present invention.

DETAILED DESCRIPTION

Figure 1:
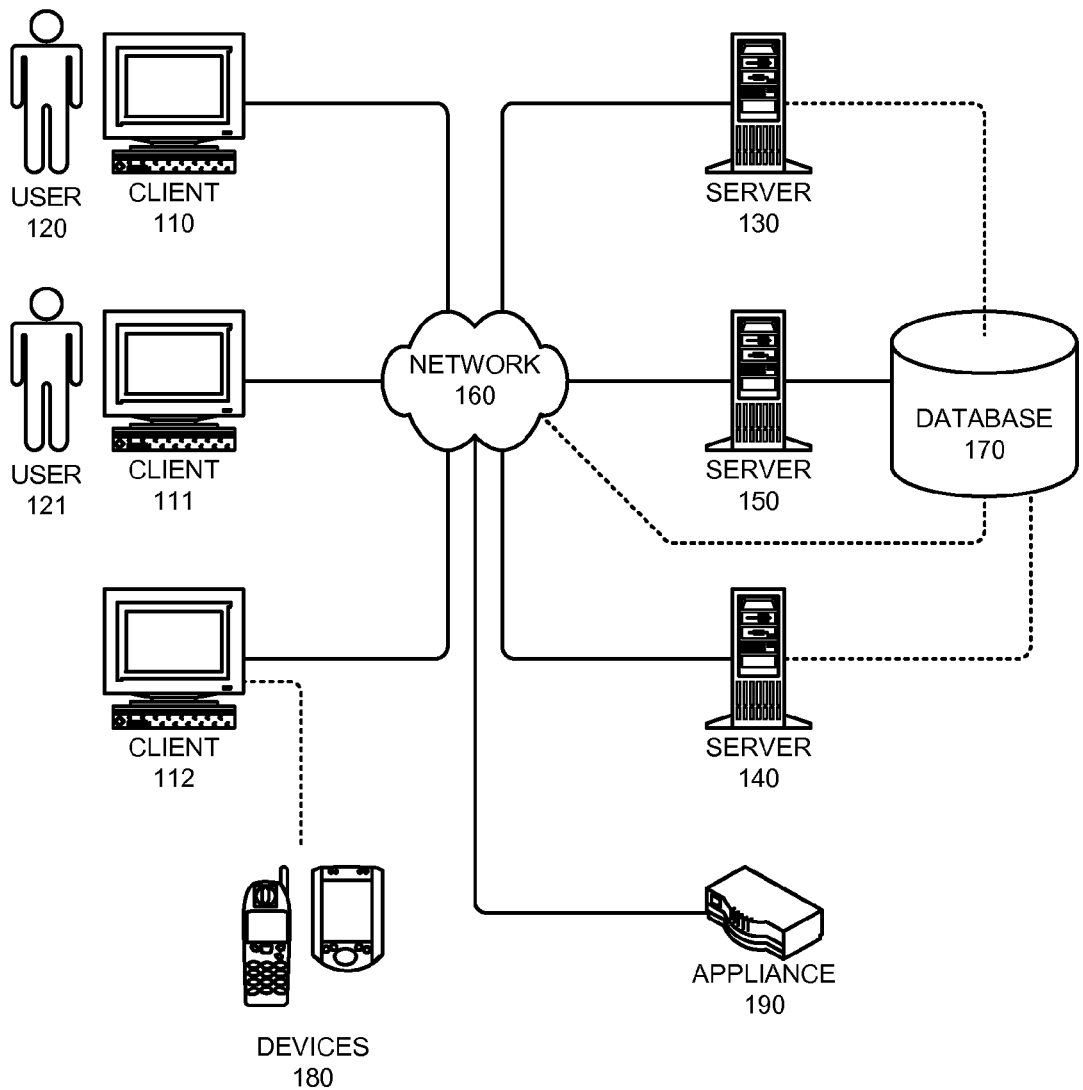
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile 15 memory, non-volatile memory, magnetic and optical storage devices such as disk drives, magnetic tape, CDs (compact discs), DVDs (digital versatile discs or digital video discs), or other media capable of storing computer-readable media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates selecting an item from a cache based on a rank-order of the item. During operation, the system picks a first item from a cache. The system also picks a second item from the cache. Next, the system compares a rank-order of the first item with a rank-order of the second item. If the rank-order of the first item exceeds the rank-order of the second item, the system designates the first item as a winner of a first contest. However, if the rank-order of the first item is less than the rank-order of the second item, the system designates the second item as the winner of the first contest. Finally, the system selects the winner of the first contest as a selected item.

Note that the rank-order can be based on a statistical approximation of the relevance of an item in the cache to the other items in the cache. In some embodiments of the present invention, if a first item has a higher rank-order than a second item, then the first item is considered to be more relevant to the cache criteria than the second item. However, in other embodiments of the present invention, the opposite is true: the lower the rank-order of an item, the more relevant the item is to the cache criteria.

Also note that embodiments of the present invention operate when a cache is accessed based on one or more criteria. Items in the cache relate to various criteria, and these criteria change over time.

In some embodiments of the present invention, the items are chosen from the cache at random, while in other embodiments, they are chosen from the cache using a pseudo-random technique, or any other selection technique.

In some embodiments, the system picks a third item and a fourth item from the cache. Next, the system compares a rank-order of the third item with a rank-order of the fourth item. If the rank-order of the third item exceeds the rank-order of the fourth item, the system designates the third item as a winner of a second contest. However, if the rank-order of the third item is less than the rank-order of the fourth item, the system designates the fourth item as the winner of the second contest. The system then compares the rank-order of the winner of the first contest and the rank-order of the winner of the second contest. If the rank-order of the winner of the first contest exceeds the rank-order of the winner of the second contest, the system selects the winner of the first contest as the selected item. However, if the rank-order of the winner of the first contest is less than the rank-order of the winner of the second contest, the system selects the winner of the second contest as the selected item.

By holding two contests, and then having a third contest between the winners of the first two contests, the probability of selecting a particular item is based on the square of the rank-order.

In some embodiments of the present invention, selecting the selected item further involves performing n additional contests, wherein the selected item is an overall winner of the n additional contests. In this embodiment, the system can achieve a probability of selecting a particular item based on the $n^{th}$ power of the rank-order, wherein the system performs contests by initially choosing $2^n$ items.

In some embodiments of the present invention, the first contest, the second contest, and the n additional contests are conducted in parallel.

In some embodiments of the present invention, the system receives a new item which is not in the cache. Next, the system picks a third item from the cache. The system then compares a rank-order of the new item and a rank-order of the third item. Finally, if the rank-order of the new item exceeds the rank-order of the third item, the system evicts the third item from the cache, and inserts the new item into the cache.

In many cases, it may be difficult to determine a priori the relevance of a new item (not already in the cache) to the cache criteria as compared to the relevance of existing items already in the cache. In these embodiments, the system may apply n contests, using the new item as one of the initial items in the n contests.

In some embodiments of the present invention, the selected item is evicted from the cache. Note that the system may also choose to evict items in a batch process. For example, the system may choose to evict 20 items from the cache, and may hold 20 separate contests, evicting the winners (or losers) of each contest.

In some embodiments of the present invention, the selected item is returned to a user or an application. Besides eviction, embodiments of the present invention may be used for selecting items from the cache on behalf of a user or an application. For example, a user may query the system for ten pictures of high-profile politicians. The system may then hold ten separate contests in order to return ten items from the cache that match the user's request. Note that while this probably will not return the ten "best" pictures, it will statistically return better pictures than returning ten pictures at random.

In some embodiments of the present invention, the cache is not sorted. Note that items are constantly added to and evicted from a typical cache. Hence, in these embodiments, attempting to sort the cache, and attempting to keep the cache in a sorted order, may be unpractical.

Note that every time the cache criteria change, the implied rank-order for items in the cache changes. In some embodiments, the cache is not flushed when the cache criteria change.

In some embodiments of the present invention, the cache is implemented in software.

One embodiment of the present invention provides a system that facilitates selecting an item from a cache based on a rank-order of the item. During operation, the system picks a first item, a second item, and a third item from a cache. The system then compares a rank-order of the first item, a rank-order of the second item, and a rank-order of the third item. If the rank-order of the first item is in the middle of the rank-order of the first item, the second item, and the third item, the system selects the first item as a selected item. If the rank-order of the second item is in the middle of the rank-order of the first item, the second item, and the third item, the system selects the second item as the selected item. Similarly, if the rank-order of the third item is in the middle of the rank-order of the first item, the second item, and the third item, the system selects the third item as the selected item.

In these embodiments, the system can attempt to evict items that are farther from the "medianness" of the cache, or select items that are closer to the medianness. What is important here is to select items that are in the median of the central rank-order, and to evict items that deviate from the median of the central rank-order.

Exemplary Embodiment

Embodiments of the present invention provide a system for cache eviction without actually sorting the elements of the cache. While each of these evictions may not be optimal (in terms of adhering to exact goals of the cache eviction), over large numbers of evictions, the system can retain/eliminate items from the cache in proportion to their rank-order (or square, or any arbitrary power of their rank-order). Similarly this system can eliminate items from the cache in proportion to deviation from medianness, wherein medianness is defined with respect to the central rank-order.

Note that the following examples discuss eviction of items from the cache, but could also apply to selection of items from the cache as well.

Rank-Order-Based Eviction

Consider the example where there are n elements in the cache and the system uses a comparator C(t). The comparator itself is a function of the time, and changes over time. The basic premise is very simple and has two steps: (1) Pick any two random elements from the cache. Note that the random selection implies that all elements are equally likely to be picked. (2) Compare the two elements, and evict the loser. During this comparison, elements are likely to win in proportion to their rank-order in the group. Therefore, while the items are not sorted in the group, the largest element (the element with the highest rank-order) is n times more likely to remain in the cache than the smallest element (the element with the lowest rank-order).

Note that these two steps make the entire process likely to select/eliminate items based on the proportion of their rank-order. This is achieved without sorting the entire list. Note that the overhead in sorting may be prohibitive for large-sized caches. Almost inevitably, achieving optimality in the eviction technique from the cache is not nearly as significant as the raw performance of the cache, so sorting may not be worth the expense.

Square/$n^{th}$ Power of Rank-Order-Based Eviction

For the square of the rank-order proportioned eviction, the system performs the above steps (1) and (2) twice. Hence, the system runs contests for two items in each contest (four items in total). Then the winners of each contest have a final contest, and the winner is promoted from the final contest.

Note that the two individual contests have no dependencies whatsoever, and can be performed in parallel on a simple two core, or two CPU machine. Also note that in order to perform this comparison and achieve the ratio of square of the rank-proportioned eviction, the system require $2^2$ elements to be picked and compared. Similarly, to achieve $n^{th}$ power of the rank-order, the system requires $2^n$ elements.

Using the powers of rank-orders, the system can make eviction more accurate and closer to evicting based on optimality. However, this accuracy comes at the cost of more comparisons and more elements picked from the cache per eviction.

Centrality and Powers of Centrality

In some embodiments of the present invention, the system seeks to eliminate or preserve items based on their centrality of rank in the cache based on a Comparator C(t). The system operates by picking three elements from the cache. The system then sorts the three elements and evicts the extreme two elements, which has the effect of preserving centrality. Note that the system could also evict the central element to preserve the extremes.

As with the previous examples, this contest of three rule can be run twice, to achieve eviction/retention in proportion to the square of the medianness (centrality of rank-order). To achieve square of centrality, the system picks three items in three contests and promotes the winners. The system then runs a contest with the three promoted winners. Note that this implies picking $3^3$ elements.

Similarly, for $n^{th}$ power of centrality evictions, the system initially picks $3^n$ elements. However the n contests in the first round can be executed in parallel, and this example only requires n synchronous contests.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100. Any device that is capable of communicating via network 160 may incorporate elements of the present invention.

Apparatus

Figure 2:
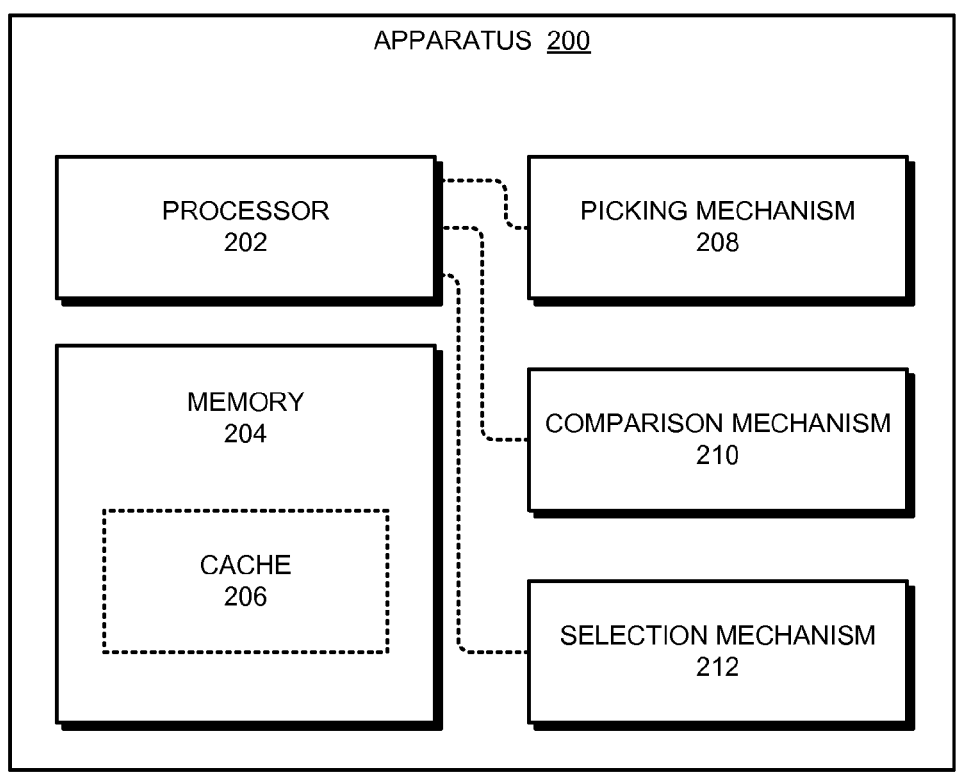
FIG. 2 illustrates an apparatus in accordance with an embodiment of the present invention.

FIG. 2 illustrates apparatus 200 in accordance with an embodiment of the present invention. One embodiment of the present invention provides apparatus 200 which is configured to select an item from cache 206 based on a rank-order of the item. Apparatus 200 includes: processor 202, memory 204, item cache 206 located in memory 204, picking mechanism 208, comparison mechanism 210, and selection mechanism 212.

Picking mechanism 208 is configured to pick a first item and a second item from cache 206.

Comparison mechanism 210 is configured to: compare a rank-order of the first item with a rank-order of the second item; designate the first item as a winner of a first contest if the rank-order of the first item exceeds the rank-order of the second item; and to designate the second item as the winner of the first contest if the rank-order of the first item is less than the rank-order of the second item.

Selection mechanism 212 is configured to select the winner of the first contest as a selected item.

In another embodiment of the present invention, picking mechanism 208 is further configured to pick a third item from cache 206.

In this embodiment, comparison mechanism 210 is further configured to compare the rank-order of the first item, the rank-order of the second item, and a rank-order of the third item.

In this embodiment, selection mechanism 212 is further configured to: select the first item as the selected item if the rank-order of the first item is in the middle of the rank-order of the first item, the second item, and the third item; select the second item as the selected item if the rank-order of the second item is in the middle of the rank-order of the first item, the second item, and the third item; and to select the third item as the selected item if the rank-order of the third item is in the middle of the rank-order of the first item, the second item, and the third item.

Process of Rank-Order Selection

Figure 3A:
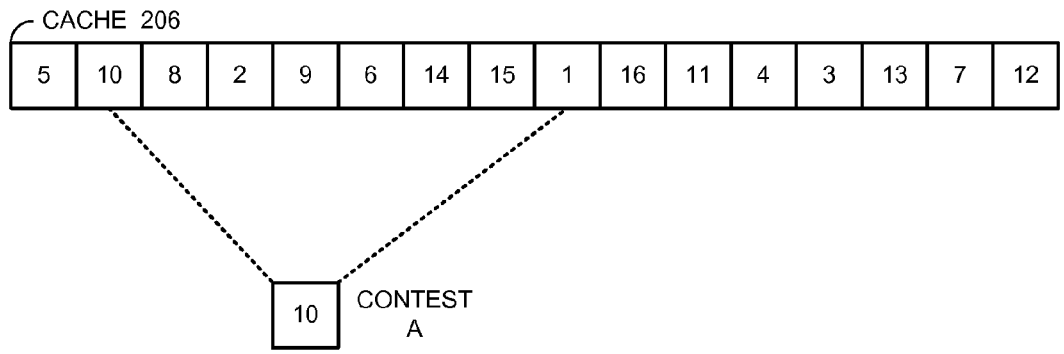
FIGS. 3A-3C illustrate selection contests in accordance with an embodiment of the present invention.
Figure 3B:
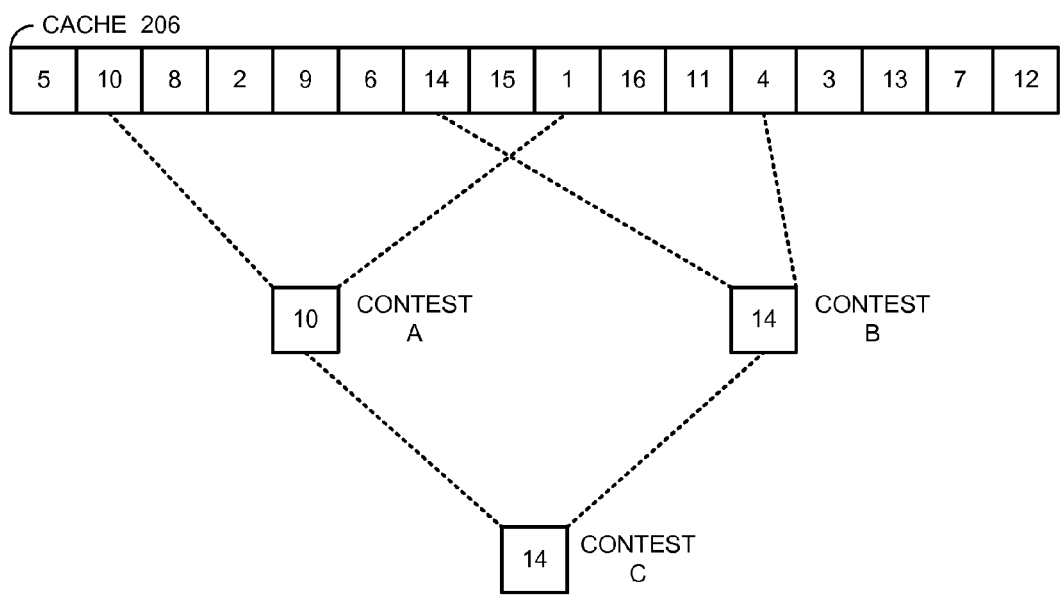
Figure 3C:
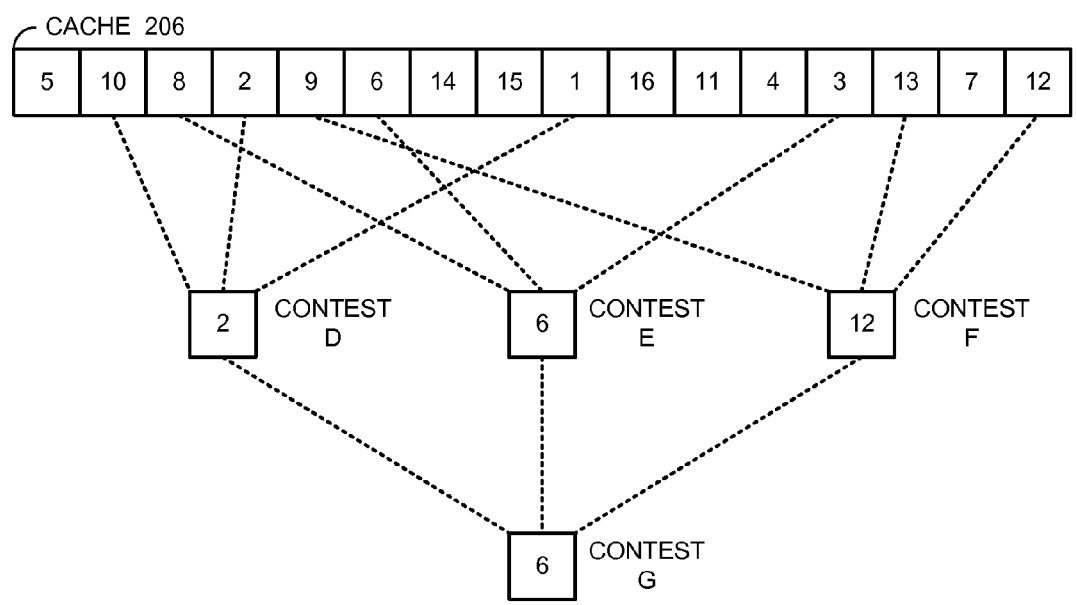

FIGS. 3A-3C illustrate selection contests in accordance with an embodiment of the present invention. FIG. 4 presents a flow chart illustrating the process of rank-order selection in accordance with an embodiment of the present invention.

During operation, the system picks two items at random from cache 206 (operation 402). Next, the system compares the rank-order of the two items (operation 404), and selects the item with the higher rank-order (operation 406). Note that, as previously described, the system may be configured to select the item with the lower rank-order.

For example, as illustrated in FIG. 3A, during Contest A, the system chooses an item from cache 206 with a rank-order of 10. The system also randomly chooses an item from cache 206 with a rank-order of 1. The system then compares the two items and selects the item with the rank-order of 10 as the winner of Contest A.

Note that in some embodiments of the present invention, the system may evict the selected item from the cache, or return the selected item to an application, or to a user, such as user 120. However, in other embodiments of the present invention, the system may iterate operations 402-406 n times, and perform additional contests after every two contests, selecting the winners of the two contests as the inputs for the additional contests.

For example, as illustrated in FIG. 3B, during Contest A, the system randomly chooses an item from cache 206 with a rank-order of 10. The system also randomly chooses an item from cache 206 with a rank-order of 1. The system then compares the two items and selects the item with the rank-order of 10 as the winner of Contest A.

While the system performs Contest A, the system also performs Contest B. During Contest B, the system randomly chooses an item from cache 206 with a rank-order of 14. The system also randomly chooses an item from cache 206 with a rank-order of 4. The system then compares the two items and selects the item with the rank-order of 14 as the winner of Contest B.

The system then performs Contest C, choosing among the winners of Contest A and Contest B. In this example, the system chooses the item with the rank-order of 14 as the winner of Contest C.

Process of Selection Based on Centrality

FIG. 5 presents a flow chart illustrating the process of selection based on centrality in accordance with an embodiment of the present invention.

During operation, the system picks three items at random from cache 206 (operation 502). Next, the system compares the rank-order of the three items (operation 504), and selects the item with the central rank-order (operation 506). Note that, as previously described, the system may be configured to select the items with the outside rank-orders.

Note that in some embodiments of the present invention, the system may evict the selected item from the cache, or return the selected item to an application, or to a user, such as user 120. However, in other embodiments of the present invention, the system may iterate operations 502-506 n times, and perform additional contests after every three contests, selecting the winners of the three contests as the inputs for the additional contests.

For example, as illustrated in FIG. 3C, during Contest D, the system randomly chooses an item from cache 206 with a rank-order of 10, an item from cache 206 with a rank-order of 2, and an item from cache 206 with a rank-order of 1. The system then compares the three items and selects the central item with the rank-order of 2 as the winner of Contest D.

At the same time the system performs Contest D, the system also performs Contest E. During Contest E, the system randomly chooses an item from cache 206 with a rank-order of 8, an item from cache 206 with a rank-order of 6, and an item from cache 206 with a rank-order of 3. The system then compares the three items and selects the central item with the rank-order of 6 as the winner of Contest E.

While the system performs Contest D and Contest E, the system also performs Contest F. During Contest F, the system randomly chooses an item from cache 206 with a rank-order of 9, an item from cache 206 with a rank-order of 13, and an item from cache 206 with a rank-order of 12. The system then compares the three items and selects the central item with the rank-order of 12 as the winner of Contest E.

The system then performs Contest G, which chooses among the winners of Contest D, Contest E, and Contest F. In this example, the system chooses the central item with the rank-order of 6 as the winner of Contest G.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method utilizing a computer for selecting an item from an unsorted cache based on a rank-order of the item, the method comprising:
    picking a first item from the unsorted cache;
    picking a second item from the unsorted cache, wherein the first item and the second item are picked randomly from the unsorted cache;
    obtaining a first rank-order of the first item and a first rank order of the second item, wherein the first rank-orders of the first item and the second item are associated with a first cache access criterion;
    comparing the first rank-order of the first item with the first rank-order of the second item in a first contest;
    if the first rank-order of the first item exceeds the first rank-order of the second item, designating the first item as a winner of the first contest;
    if the first rank-order of the first item is less than the first rank-order of the second item, designating the second item as the winner of the first contest;
    selecting the winner of the first contest as a first selected item;
    obtaining a second rank-order of the first item and a second rank-order of the second item, wherein the second rank-orders of the first item and the second item are associated with a second cache access criterion;
    comparing the second rank-order of the first item with the second rank-order of the second item in another first contest, wherein the first contest and the other first contest are independent of each other;
    if the second rank-order of the first item exceeds the second rank-order of the second item, designating the first item as a winner of the other first contest;
    if the rank-order of the first item is less than the rank-order of the second item, designating the second item as the winner of the other first contest;
    selecting the winner of the other first contest as a second selected item; and
    receiving a new item not in the unsorted cache;
    picking a third item randomly from the unsorted cache,
    comparing a first rank-order of the new item and a first rank-order of the third item, if the first rank-order of the new item exceeds the first rank-order of the third item: evicting the third item from the unsorted cache, and inserting the new item into the unsorted cache.

2. The method of claim 1, further comprising:
    picking a fourth item randomly from the unsorted cache;
    comparing the first rank-order of the third item with a first rank-order of the fourth item in a second contest, the second contest being independent of the first contest;
    if the first rank-order of the third item exceeds the first rank-order of the fourth item, designating the third item as a winner of the second contest;
    if the first rank-order of the third item is less than the first rank-order of the fourth item, designating the fourth item as the winner of the second contest;
    comparing the first rank-order of the winner of the first contest and the first rank-order of the winner of the second contest for the first cache access criterion;
    if the first rank-order of the winner of the first contest exceeds the first rank-order of the winner of the second contest, selecting the winner of the first contest as an aggregate selected item; and
    if the first rank-order of the winner of the first contest is less than the first rank-order of the winner of the second contest, selecting the winner of the second contest as the aggregate selected item.

3. The method of claim 2, wherein selecting the aggregate selected item further involves performing n additional contests, wherein the selected item is an overall winner of the n additional contests.

4. The method of claim 3, wherein the first contest, the other first contest, the second contest, and the n additional contests are conducted in parallel.

5. The method of claim 1, wherein the first selected item is evicted from the unsorted cache based on a pre-defined criterion.

6. The method of claim 1, wherein the first selected item is returned to one of a user and an application.

7. A method utilizing a computer for selecting an item from an unsorted cache based on a rank-order of the item, the method comprising:
    picking a first item from the unsorted cache;
    picking a second item from the unsorted cache;
    picking a third item from the unsorted cache, wherein the first, second, and third item are picked randomly from the unsorted cache;
    obtaining a first rank-order of the first item, a first rank-order of the second item, and a first rank-order of the third item, wherein the first rank-orders of the first item, the second item, and the third item are associated with a first cache access criteria;
    comparing the first rank-order of the first item, the first rank-order of the second item, and the first rank-order of the third item;
    if the first rank-order of the first item is in middle of the first rank-order of the second item, and the first rank-order of the third item, selecting the first item as a selected item;
    if the first rank-order of the second item is in the middle of the first rank-order of the first item, and the first rank-order of the third item, selecting the second item as the selected item;
    if the first rank-order of the third item is in the middle of the first rank-order of the first item, and the first rank-order of the second item, selecting the third item as the selected item;
    obtaining a second rank-order of the first item, a second rank-order of the second item, and a second rank-order of the third item, wherein the second rank-orders of the first item, the second item, and the third item are associated with a second cache access criterion;

comparing the second rank-order of the first item, the second rank-order of the second item, and the second rank-order of the third item;
if the second rank-order of the first item is in the middle of the second rank-order of the second item, and the second rank-order of the third item, selecting the first item as another selected item;
if the second rank-order of the second item is in the middle of the second rank-order of the first item, and the second rank-order of the third item, selecting the second item as the other selected item;
if the second rank-order of the third item is in the middle of the second rank-order of the first item, and the second rank-order of the second item, selecting the third item as the other selected item; and
receiving a new item not in the unsorted cache;
picking a fourth item randomly from the unsorted cache,
comparing a first rank-order of the new item and a first rank-order of the fourth item, if the first rank-order of the new item exceeds the first rank-order of the fourth item: evicting the fourth item from the unsorted cache, and inserting the new item into the unsorted cache.

8. A non-transitory computer-readable storage medium storing instructions that when executed by a computer cause the computer to perform a method for selecting an item from an unsorted cache based on a rank-order of the item, the method comprising:
picking a first item from the unsorted cache;
picking a second item from the unsorted cache, wherein the first item and the second item are picked randomly from the unsorted cache;
obtaining a first rank-order of the first item and a first rank-order of the second item, wherein the first rank-orders of the first item and the second item are associated with a first cache access criterion;
comparing the first rank-order of the first item with the first rank-order of the second item in a first contest;
if the first rank-order of the first item exceeds the first rank-order of the second item, designating the first item as a winner of the first contest;
if the first rank-order of the first item is less than the first rank-order of the second item, designating the second item as the winner of the first contest; and
selecting the winner of the first contest as a first selected item;
obtaining a second rank-order of the first item and a second rank-order of the second item, wherein the second rank-orders of the first item and the second item are associated with a second cache access criterion;
comparing the second rank-order of the first item with the second rank-order of the second item in another first contest, wherein the first contest and the other first contest are independent of each other;
if the second rank-order of the first item exceeds the second rank-order of the second item, designating the first item as a winner of the other first contest;
if the second rank-order of the first item is less than the second rank-order of the second item, designating the second item as the winner of the other first contest;
selecting the winner of the other first contest as a second selected item; and
receiving a new item not in the unsorted cache;
picking a third item randomly from the unsorted cache;
comparing a first rank-order of the new item and a first rank-order of the third item, if the first rank-order of the new item exceeds the first rank-order of the third item: evicting the third item from the unsorted cache, and inserting the new item into the unsorted cache.

9. The computer-readable storage medium of claim 8, wherein the method further comprises:
picking a fourth item randomly from the unsorted cache;
comparing the first rank-order of the third item with a first rank-order of the fourth item in a second contest, the second contest being independent of the first contest;
if the first rank-order of the third item exceeds the first rank-order of the fourth item, designating the third item as a winner of the second contest; and
if the first rank-order of the third item is less than the first rank-order of the fourth item, designating the fourth item as the winner of the second contest;
comparing the first rank-order of the winner of the first contest and the first rank-order of the winner of the second contest for the first cache access criterion;
if the first rank-order of the winner of the first contest exceeds the first rank-order of the winner of the second contest, selecting the winner of the first contest as an aggregate selected item; and
if the first rank-order of the winner of the first contest is less than the first rank-order of the winner of the second contest, selecting the winner of the second contest as the aggregate selected item.

10. The computer-readable storage medium of claim 9, wherein selecting the aggregate selected item further involves performing n additional contests, and wherein the selected item is an overall winner of the n additional contests.

11. The computer-readable storage medium of claim 10, wherein the first contest, the other first contest, the second contest, and the n additional contests are conducted in parallel.

12. The computer-readable storage medium of claim 8, wherein the first selected item is evicted from the unsorted cache based on a pre-defined criterion.

13. The computer-readable storage medium of claim 8, wherein the first selected item is returned to one of a user and an application.

14. A non-transitory computer-readable storage medium storing instructions that when executed by a computer cause the computer to perform a method for selecting an item from an unsorted cache based on a rank-order of the item, the method comprising:
picking a first item from the unsorted cache;
picking a second item from the unsorted cache;
picking a third item from the unsorted cache, wherein the first, second, and third items are picked randomly from the unsorted cache;
obtaining a first rank-order of the first item, a first rank-order of the second item, and a first rank-order of the third item, wherein the first rank-orders of the first item, the second item, and the third item are associated with a first cache access criterion;
comparing the first rank-order of the first item, the first rank-order of the second item, and the first rank-order of the third item;
if the first rank-order of the first item is in a middle of the first rank-order of the second item, and the first rank-order of the third item, selecting the first item as a selected item;
if the first rank-order of the second item is in the middle of the first rank-order of the first item, and the first rank-order of the third item, selecting the second item as the selected item;

if the first rank-order of the third item is in the middle of the first rank-order of the first item, and the first rank-order of the second item, selecting the third item as the selected item;

obtaining a second rank-order of the first item, a second rank-order the second item, and a second-rank order of the third item, wherein the second rank-orders of the first item, the second item, and the third item are associated with a second cache access criterion;

comparing the second rank-order of the first item, the second rank-order of the second item, and the second rank-order of the third item;

if the second rank-order of the first item is in the middle of the second rank-order of the second item, and the second rank-order of the third item, selecting the first item as another selected item;

if the second rank-order of the second item is in the middle of the second rank-order of the first item, and the second rank-order of the third item, selecting the second item as the other selected item; and if the second rank-order of the third item is in the middle of the second rank-order of the first item, and the second rank-order of the second item, selecting the third item as the other selected item; and receiving a new item not in the unsorted cache;

picking a fourth item randomly from the unsorted cache;

comparing a first rank-order of the new item and a first rank-order of the fourth item, if the first rank-order of the new item exceeds the first rank-order of the fourth item: evicting the fourth item from the unsorted cache, and inserting the new item into the unsorted cache.

15. An apparatus configured for selecting an item from an unsorted cache based on a rank-order of the item, comprising:

a computer processor;

a computer memory, wherein the unsorted cache being located in the computer memory;

a picking mechanism, executed by the computer processor, configured to pick a first item from the unsorted cache;

wherein the picking mechanism is further configured to pick a second item from the unsorted cache, and wherein the first item and the second item are picked randomly from the unsorted cache;

a comparison mechanism, executed by the computer processor, configured to compare a first rank-order of the first item with a first rank-order of the second item;

wherein the comparison mechanism is further configured to designate the first item as a winner of a first contest if the first rank-order of the first item exceeds the first rank-order of the second item;

wherein the first rank-orders of the first item and the second item are associated with a first cache access criterion, and wherein the comparison mechanism is further configured to designate the second item as the winner of the first contest if the first rank-order of the first item is less than the first rank-order of the second item; and a selection mechanism, executed by the computer processor, configured to select the winner of the first contest as a first selected item;

wherein the comparison mechanism is configured to compare a second rank-order of the first item with a second rank-order of the second item, wherein the second rank-orders of the first item and the second item are associated with a second cache access criterion, wherein the comparison mechanism is further configured to designate the first item as a winner of another first contest if the second rank-order of the first item exceeds the second rank-order of the second item, wherein the comparison mechanism is further configured to designate the second item as the winner of the other first contest if the second rank-order of the first item is less than the second rank-order of the second item, and wherein the selection mechanism is configured to select the winner of the other first contest as a second selected item; and receiving a new item not in the unsorted cache;

picking a third item randomly from the unsorted cache;

comparing a first rank-order of the new item and a first rank-order of the third item, if the first rank-order of the new item exceeds the first rank-order of the third item: evicting the third item from the unsorted cache, and inserting the new item into the unsorted cache.

16. The apparatus of claim 15:

wherein the comparison mechanism is further configured to compare the first rank-order of the first item, the first rank-order of the second item, and the first rank-order of the third item;

wherein the selection mechanism is further configured to select the first item as the first selected item if the first rank-order of the first item is in the middle of the first rank-order of the second item, and the first rank-order of the third item;

wherein the selection mechanism is further configured to select the second item as the first selected item if the first rank-order of the second item is in the middle of the first rank-order of the first item, and the first rank-order of the third item; and wherein the selection mechanism is further configured to select the third item as the first selected item if the first rank-order of the third item is in the middle of the first rank-order of the first item, and the first rank-order of the second item.

* * * * *